United States Patent
Teschner et al.

(10) Patent No.: US 6,439,654 B1
(45) Date of Patent: Aug. 27, 2002

(54) MOTOR VEHICLE ROOF

(75) Inventors: Helmut Teschner, Finning; Walter Schåtzler, Starnberg; Hans Jardin, Bachern; Manfred Pfalzgraf, Herrsching, all of (DE)

(73) Assignee: Webasto Karosseriesysteme GmbH, Stockdorf (DE)

(*) Notice: Subject to any disclaimer, the term of this patent is extended or adjusted under 35 U.S.C. 154(b) by 0 days.

(21) Appl. No.: 09/428,997

(22) Filed: Oct. 28, 1999

(30) Foreign Application Priority Data

Oct. 29, 1998 (DE) .......................... 198 49 840

(51) Int. Cl.[7] .................................. B60J 7/00
(52) U.S. Cl. ................. 296/211; 296/215; 296/214; 296/217
(58) Field of Search ............................... 296/211, 215, 296/216.03, 220.01, 216.02, 217, 216.06–216.09, 214

(56) References Cited

U.S. PATENT DOCUMENTS

| | | | | |
|---|---|---|---|---|
| 4,811,985 A | * | 3/1989 | Kruger et al. | 296/216.08 X |
| 5,031,959 A | * | 7/1991 | Queveau | 296/223 |
| 5,248,278 A | * | 9/1993 | Fuerst et al. | 296/217 |
| 6,019,411 A | * | 2/2000 | Carter et al. | 296/215 X |

FOREIGN PATENT DOCUMENTS

| | | | | |
|---|---|---|---|---|
| BE | 533581 | * | 5/1958 | 296/216.02 |
| DE | 37 13 854 | | 10/1987 | |
| DE | 3713854 | * | 10/1987 | 296/211 |
| DE | 37 25 053 | | 2/1989 | |
| JP | 0213518 | * | 12/1984 | 296/211 |

* cited by examiner

Primary Examiner—Dennis H. Pedder
(74) Attorney, Agent, or Firm—Nixon Peabody LLP; David S. Safran

(57) ABSTRACT

A motor vehicle roof including a front roof opening and a rear roof opening, a movable front cover for covering the front roof opening, the movable front cover being movably guided on a frame member and substantially transparent with a nonviewing area and a viewing area to allow viewing of objects through the front cover, a stationary rear cover for covering the rear roof opening, the stationary rear roof cover being supported on the frame and substantially transparent with a nonviewing area and a viewing area to allow viewing of objects through the stationary rear cover, and solar cells provided proximate to at least one of the nonviewing area of the movable front cover and the nonviewing area of the stationary rear cover.

19 Claims, 3 Drawing Sheets

MOTOR VEHICLE ROOF

BACKGROUND OF THE INVENTION

1. Field of the Invention

The present invention relates to a transparent motor vehicle roof. In particular, the present invention relates to such a motor vehicle roof including solar cells.

2. Description of Related Art

Published German patent application DE 37 25 053 A1 discloses a motor vehicle glass roof with an outside first glass pane made from flint glass in which a smaller glass pane adapted to absorb part of the incident solar energy is provided in a first partial area above a viewing opening formed in the bottom of the solid roof skin in a sandwich-like construction, and is provided with solar cells in a second partial area on a bottom surface which is above a solid roof part. The disadvantage in the disclosed motor vehicle glass roof is the fact that the glass roof cannot be opened.

Published German patent application DE 37 13 854 discloses a motor vehicle roof with a roof opening which can be closed by two movable covers in a solid roof skin, the front cover which is made as a sliding and lifting cover consisting essentially of a pane of transparent material which is provided with solar cells in its edge area which is designed to prevent viewing of the cover mechanism from above. The rear cover can be removed from its mounting as a whole by hand so that the front cover can be pushed fully to the rear. The disadvantage in the disclosed motor vehicle roof is the complicated operation of the rear cover in forming a large viewing surface.

SUMMARY OF THE INVENTION

One object of the present invention to provide a motor vehicle roof which allows viewing of the outside from a large area of the motor vehicle interior.

Another object of the present invention is to provide such a motor vehicle roof which can be opened.

Still another object of the present invention is to provide such a motor vehicle roof which efficiently uses solar energy incident on the roof.

Yet another object of the present invention is to provide such a motor vehicle roof that can be easily and economically produced.

In accordance with the preferred embodiments of the present invention, these objects and others are achieved by a motor vehicle roof including a front roof opening and a rear roof opening, a movable front cover for covering the front roof opening, the movable front cover being movably guided on a frame member and substantially transparent with a nonviewing area and a viewing area to allow viewing of objects through the front cover, a stationary rear cover for covering the rear roof opening, the stationary rear roof cover being supported on the frame and substantially transparent with a nonviewing area and a viewing area to allow viewing of objects through the stationary rear cover, and solar cells provided proximate to at least one of the nonviewing area of the movable front cover and the nonviewing area of the stationary rear cover.

The motor vehicle roof in accordance with the present invention advantageously uses solar radiation to produce solar energy without inhibiting viewing outside the vehicle through the motor vehicle roof from the vehicle's interior which is optimally possible by virtue of the construction. By providing two independent roof openings with separate covers, extensive light incidence or extensive viewing to the outside with a simultaneous capacity to open the motor vehicle roof is ensured while a simple structure of the roof is made possible.

The solar cells can be located in a nonviewing area of one or more of the front and/or rear covers toward a rear edge and/or side edge of the covers.

In the area of the front edge of the front roof opening which can be closed by the movable front cover, there may be provided a wind deflection louver which is covered with solar cells.

In one preferred embodiment of the present invention, a viewing area of at least one of the front and/or rear covers are provided with a coating which reduces transmission in the infrared spectral range and/or the transmission of visible light. In this way, excess incident solar radiation into the motor vehicle interior or excess heating thereof, can be prevented.

In an alternative embodiment, the stationary rear cover may be divided into one solar pane provided with solar cells and separate a viewing pane. In this embodiment, the solar pane is preferably made from clear glass or flint glass while the viewing pane is designed to reduce the transmission of visible light and/or infrared radiation. This allows optimal use of the solar energy with increased comfort for the passengers while ensuring easy manufacturability of the solar pane and the viewing pane.

These and other objects, features and advantages of the present invention will become more apparent from the following detailed description of the preferred embodiments of the invention when viewed in conjunction with the accompanying drawings.

DETAILED DESCRIPTION OF THE PREFERRED EMBODIMENT

Figure 1:
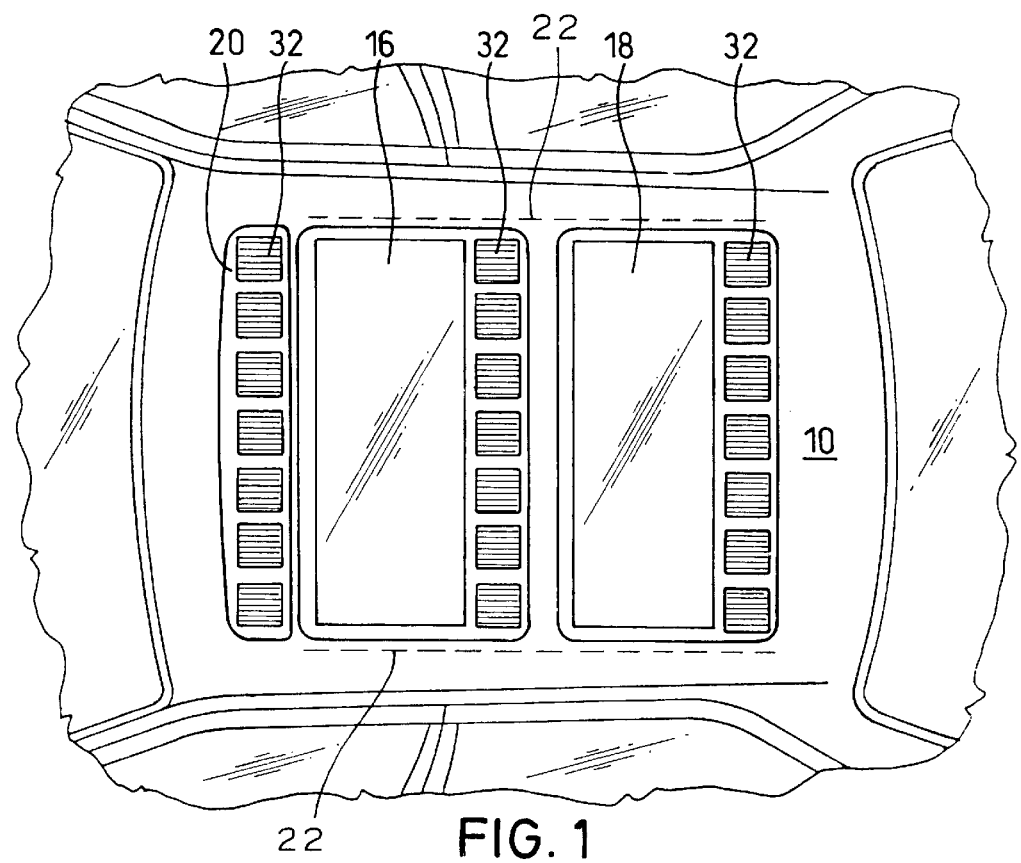
FIG. 1 shows an overhead view of a motor vehicle roof in accordance with one embodiment of the present invention.
Figure 2:
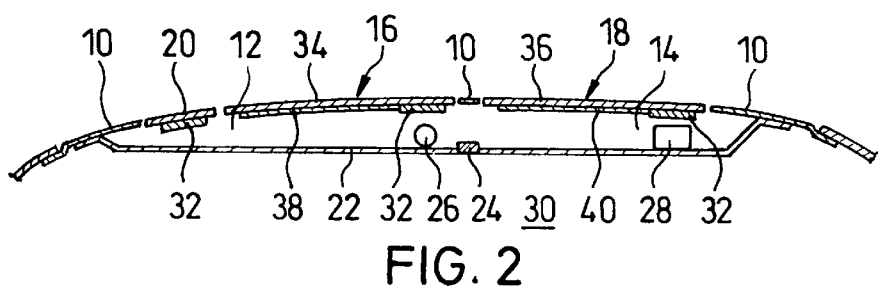
FIG. 2 shows a lengthwise cross-sectional view of the motor vehicle roof of FIG. 1.

FIGS. 1 and 2 illustrate a motor vehicle roof in accordance with one embodiment of the present invention. The motor vehicle roof in accordance with the present invention described hereinbelow advantageously uses solar radiation to produce solar energy without inhibiting viewing outside the vehicle through the motor vehicle roof from the vehicle's interior which is optimally possible by virtue of the construction. By providing two independent roof openings with separate covers, extensive light incidence or extensive viewing to the outside with a simultaneous capacity to open the motor vehicle roof is ensured while a simple structure of the roof is made possible.

As can be clearly seen in FIGS. 1 and 2, two roof openings 12 and 14 are made in succession in a fixed motor vehicle roof 10. The front roof opening 12 can be closed by a movable and/or raisable front cover 16 and the rear roof opening 14 is closed by a roof-mounted stationary rear cover

18. In the area of the front edge of the front roof opening 12, there is provided a wind deflection louver 20 which can be swung outwardly. Underneath and at the side edges the roof openings 12 and 14, there is provided a frame 22 which is mounted permanently on the motor vehicle roof 10. The front cover 16 is movably guided and the rear cover 18 is supported on the frame 22. In the area between the roof openings 12 and 14, the frame 22 is stiffened by means of a cross strut 24. In this way, it is not necessary for the rear cover 18 to serve as a structural load bearing member or to perform a stiffening function so that the rear cover 18 may be made from relatively soft material. In this embodiment, in the area proximate to the cross strut 24, there is provided a roller 26 for a sliding blind (not shown) by which the roof opening 12 can be covered from underneath. On the back end of the rear roof opening 14, there may be provided a mechanism area 28 where fastening and/or drive elements for closing the sliding blind to prevent looking from the motor vehicle interior 30 to the outside.

In the illustrated embodiment, the wind deflection louver 20 is provided with solar cells 32. The front cover 16 and the rear cover 18 each comprise one transparent pane 34 and 36 respectively which can be made of a clear glass or flint glass pane. The transparent panes 34 and 36 are each provided on their bottom surfaces with solar cells 32 at their rear edge area. Thus, the transparent pane 34 of the front cover 16 is provided with solar cells 32 which lie over the cross strut 24 and the blind roller 26 while the transparent pane 36 of the rear cover 18 is provided with solar cells 32 which lie over the mechanism area 28. These areas of the transparent panes 34 and 36 cannot be used to look out of the motor vehicle interior 30 by virtue of the construction, i.e., by the construction of the motor vehicle roof 10. Thus, in the present embodiment of the invention, the solar cells 32 are provided in the nonviewing areas of the transparent panes 34 and 36. Of course, it should be appreciated that the solar cells can be located in a nonviewing area of one or more of the front and/or rear covers toward a rear edge and/or side edge of the covers.

In the viewing areas of the transparent panes 34 and 36 which allow viewing of the outside from the motor vehicle's interior 30, each of the transparent panes 34 and 36 are provided with layers 38 and 40 respectively for reducing light transmission of the front cover 16 and the rear cover 18 in the infrared range in order to prevent excess heating of the vehicle interior 30. These layers 38 and 40 can be made such that the transmission of the front and rear covers 16 and 18 in the visible spectral range is also reduced to prevent excess incident solar radiation into the vehicle interior 30 and thus, to increase comfort for the passengers. The layers 38 and 40 can be, for example, made of a colored transparent polycarbonate film which is cemented on by means of an adhesive film (not shown). Furthermore, the transparent panes 34 and/or 36 can be coated with a metal oxide before applying the polycarbonate film. Alternatively, instead of the polycarbonate film, a dark tail film which is coated to be scratch-proof can also be used. In this embodiment, the dark tail film may be cemented directly to the transparent panes 34 and/or 36 by means of applied acrylate cement. It should also be appreciated that a film need not be used at all. Instead, the transparent panes 34 and 36 may be provided with a suitable transmission-reducing coating. Such a coating may be a metal oxide such as titanium oxide which is applied to the bottom of the transparent pane 34 and/or 35 using a Sekurit® pane. Alternatively, the transparent panes 34 and/or 36 can be coated with Sigla® chromium or palladium, especially when it is made from a flat glass. Furthermore the transparent panes 34 and/or 36 can be provided with a black ceramic printing with spots or hole filters.

Figure 3:
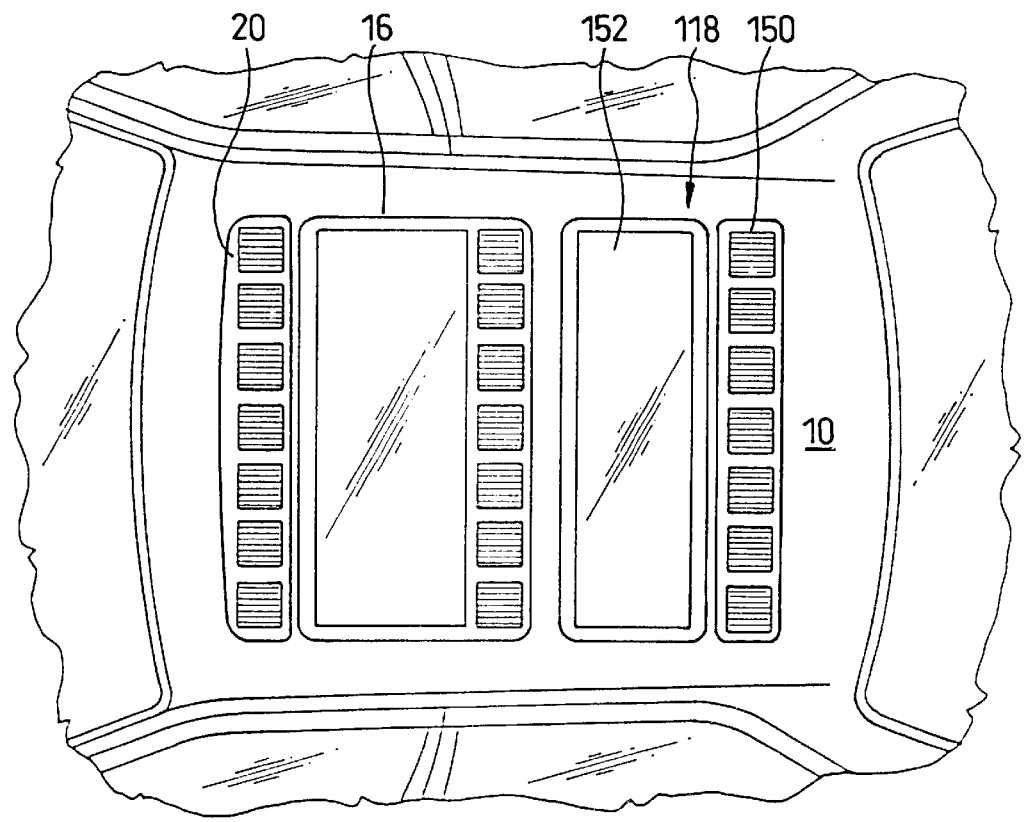
FIG. 3 shows an overhead view of a motor vehicle roof in accordance with another embodiment of the present invention.
Figure 4:
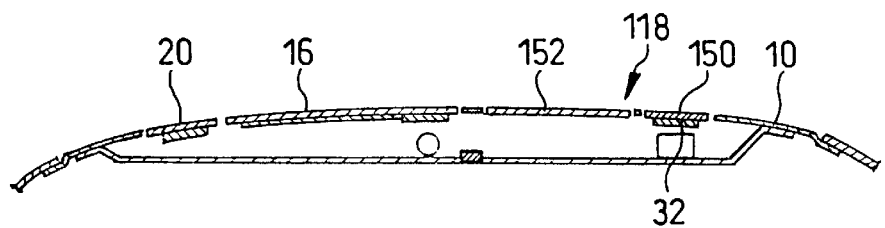
FIG. 4 shows a lengthwise cross-sectional view of the motor vehicle roof of FIG. 3.
Figure 5:
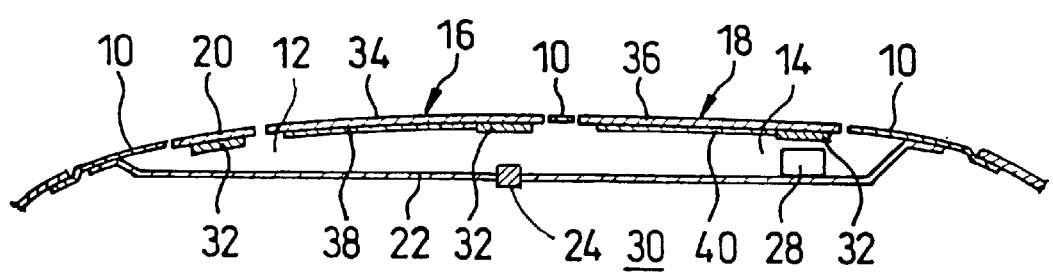
FIG. 5 is a view corresponding to that of FIG. 2 but showing a modified placement of the cross strut.

FIGS. 3 and 4 show an alternative embodiment of the present invention where the rear cover 118 is not made integral as described above, but rather, is divided into one solar pane 150 and a viewing pane 152. The solar pane 150 is preferably produced from clear glass or flint glass with solar cells 32 being provided on a bottom surface of the solar pane 150. The viewing pane 152 is designed to reduce the transmission of visible light and/or infrared radiation by coloring it. The solar pane 150 and/or the viewing pane 152 can be made as stationary or movable roof panes. This embodiment allows optimal use of the solar energy with increased comfort for the passengers while ensuring easy manufacturability of the solar pane and the viewing pane.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

We claim:

1. Motor vehicle roof comprising:
   a front roof opening and a rear roof opening;
   a movable front cover for covering said front roof opening, said movable front cover being movably guided on a frame member and being substantially transparent with a nonviewing area and a viewing area through which objects are viewable through said movable front cover;
   a stationary rear cover for covering said rear roof opening, said stationary rear roof cover being supported on said frame and substantially transparent with a nonviewing area and a viewing area through which objects are viewable through said stationary rear cover; and
   solar cells provided only in the nonviewing area of each of said movable front cover and said stationary rear cover, said nonviewing area being located only at one side of the viewing area and extending crosswise of the vehicle roof, and wherein a roller for a sliding blind is located under the nonviewing area of one of the covers and at least one of fastening and drive elements for closing of the sliding blind is located under the nonviewing area of the other of the covers.

2. Motor vehicle roof of claim 1, further comprising a cross strut positioned between said front roof opening and said rear roof opening for stiffening said frame.

3. Motor vehicle roof of claim 2, wherein said cross strut is positioned below at least one of said nonviewing area of said movable front cover and said nonviewing area of said stationary rear cover.

4. Motor vehicle roof of claim 1, wherein said solar cells are provided at said nonviewing area of said movable front cover.

5. Motor vehicle roof of claim 4, wherein said nonviewing area of said movable front cover is positioned toward a back edge of said movable front cover.

6. Motor vehicle roof of claim 4, wherein said nonviewing area of said movable front cover is positioned at an edge of said movable front cover.

7. Motor vehicle roof of claim 1, wherein said nonviewing area of said stationary rear cover is positioned at an edge of said stationary rear cover.

8. Motor vehicle roof of claim 7, wherein said nonviewing area of said stationary rear cover is positioned toward a back edge of said stationary rear cover.

9. Motor vehicle roof of claim 1, further comprising a wind deflection louver positioned proximate to a front edge of said front roof opening, said wind deflection louver including solar cells.

10. Motor vehicle roof of claim 1, wherein at least one of said viewing area of said movable front cover and said viewing area of said stationary rear cover are provided with a layer which reduces transmission in an infrared spectral range.

11. Motor vehicle roof of claim 1, wherein at least one of said viewing area of said movable front cover and said viewing area of said stationary rear cover are provided with a layer which reduces transmission of visible light.

12. Motor vehicle roof of claim 1, wherein said viewing area and said nonviewing area of said movable front cover are integrally joined to one another.

13. Motor vehicle roof of claim 1, wherein said viewing area and said nonviewing area of said stationary rear cover are integrally joined to one another.

14. Motor vehicle roof of claim 1, wherein said stationary rear cover is divided into a solar pane having said nonviewing area with solar cells and a viewing pane having said viewing area.

15. Motor vehicle roof of claim 1, wherein said solar pane is made of one of clear glass and flint glass.

16. Motor vehicle roof of claim 14, wherein said viewing pane reduces transmission of at least one of visible light and infrared radiation.

17. Motor vehicle roof of claim 14, wherein said viewing pane is colored.

18. Motor vehicle roof comprising:
   a front roof opening and a rear roof opening;
   a movable front cover for covering said front roof opening, said movable front cover being movably guided on a frame member and substantially transparent with a nonviewing area and a viewing area through which objects are viewable through said movable front cover;
   a stationary rear cover for covering said rear roof opening, said stationary rear roof cover being supported on said frame and substantially transparent with a viewing area through which objects are viewable through said stationary rear cover;
   a solar pane positioned on a pivotable wind deflection louver; and
   solar cells provided on each of said movable front cover and said stationary rear cover only at the nonviewing area which is located only at one side thereof.

19. Motor vehicle roof of claim 18, wherein said solar plane is positioned toward a rear of said motor vehicle roof, after said rear roof opening.

* * * * *